United States Patent [19]

Horner

[11] 4,093,188
[45] June 6, 1978

[54] STATIC MIXER AND METHOD OF MIXING FLUIDS

[76] Inventor: Terry A. Horner, c/o TAH Industries, P.O. Box 178, Imlaystown, N.J. 08526

[21] Appl. No.: 760,876

[22] Filed: Jan. 21, 1977

[51] Int. Cl.$^2$ .............................................. B01F 15/00
[52] U.S. Cl. .................................... 366/336; 366/337; 366/339
[58] Field of Search .................... 259/4 R, 4 A, 4 AB, 259/4 AC, 180; 138/38, 42; 239/432, 488

[56] References Cited

U.S. PATENT DOCUMENTS

| | | | |
|---|---|---|---|
| Re. 28,072 | 7/1974 | Sluijters | 259/4 AB |
| 3,190,618 | 6/1965 | Katzen | 259/4 AB |
| 3,620,506 | 11/1971 | So | 259/4 AB |
| 3,643,927 | 2/1972 | Crouch | 259/4 AB |
| 3,652,061 | 3/1972 | Chisholm | 259/4 AB |
| 3,923,288 | 12/1975 | King | 259/4 AB |
| 3,953,002 | 4/1976 | England, Jr. et al. | 259/4 AB |
| 4,019,719 | 4/1977 | Schuster et al. | 259/4 AB |

*Primary Examiner*—Leonard D. Christian
*Attorney, Agent, or Firm*—Seidel, Gonda & Goldhammer

[57] ABSTRACT

Two or more fluids, particularly viscous fluids, may be thoroughly blended and homogenized with a static mixer and method using a mixing element which comprises two or more banks of stationary baffles arranged around an axis parallel to the overall direction of flow of the fluids to be mixed. The baffles in each bank of the element are inclined at an angle to the overall flow axis and at an angle to the baffles of adjacent banks so that fluid streams are guided through windows or apertures formed by abutting baffles along the interface between adjacent banks. Each bank includes a plurality of substantially parallel baffle plates spaced along the axis, and at least one of the banks has a second set of substantially parallel baffle plates spaced along the axis and alternating with the first set of baffles. The baffles of the second set are inclined to the axis at an angle different from the inclination of the baffles of the first set so that alternately converging and diverging passages are formed between the baffles. By this means, fluid streams are successively and repeatedly subdivided, converged and redivided into a plurality of substreams in sinuous, non-parallel spiraling paths to effect a more thorough and efficient blending of the fluids than previously possible.

20 Claims, 10 Drawing Figures

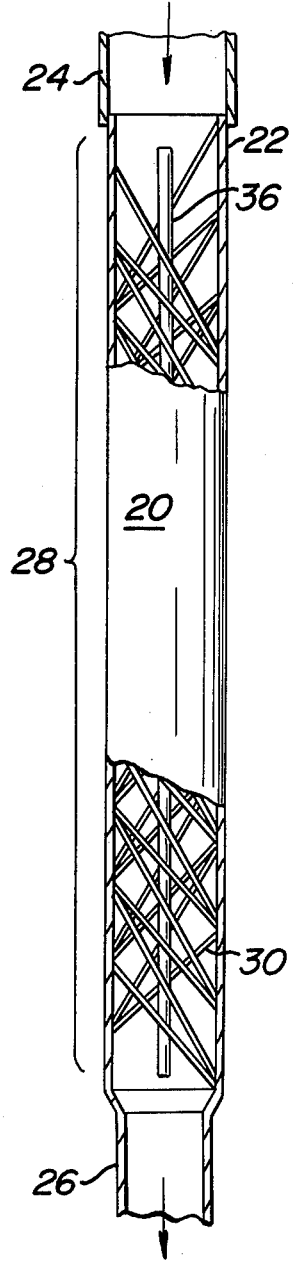
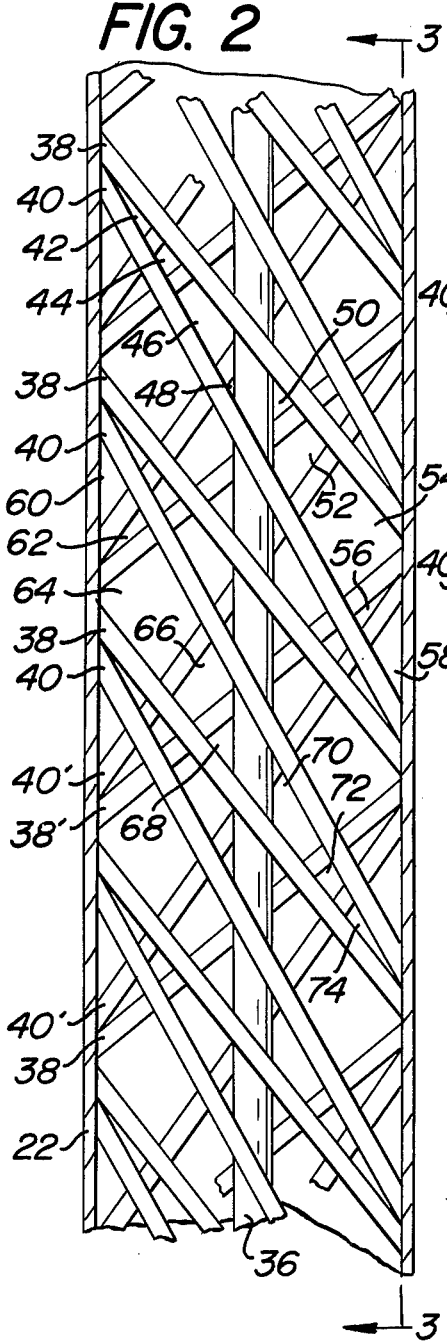
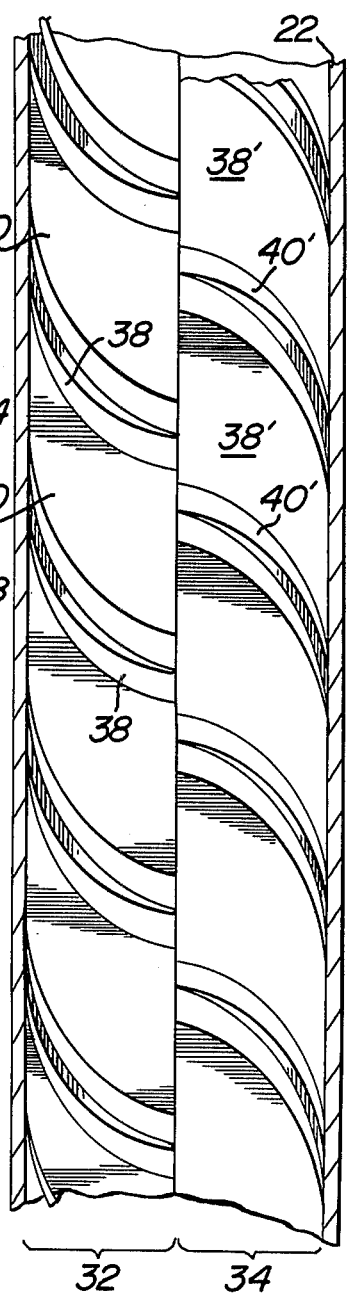
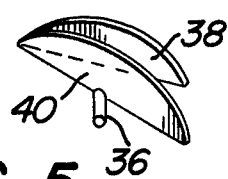
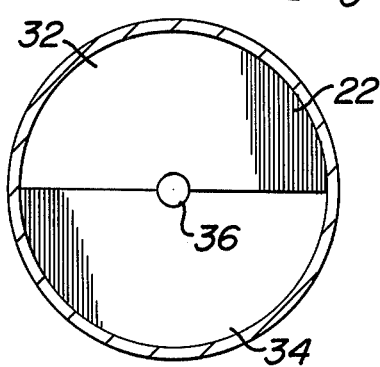

STATIC MIXER AND METHOD OF MIXING FLUIDS

BACKGROUND OF THE INVENTION

The present invention relates to a static mixer and method for mixing fluids, especially viscous fluids. More particularly, the invention is directed to a method and apparatus for mixing viscous liquids, such as polymers, using stationary baffles providing sinuous, non-parallel spiraling flow paths to promote thorough and homogenous intermixing of the fluids.

Static mixers of various constructions have been known in the art for some time, and are also referred to as stationary baffle mixers or interfacial surface generators. Representative examples of prior art static mixers are illustrated and described in U.S. Pat. Nos. 3,190,618; 3,620,506; 3,643,927; 3,652,061; 3,923,288; 3,947,939 and U.S. Pat. No. Re. 28,072, for example.

As discussed in the above prior art patents, it has previously been found that the creation of turbulence which is typical of a normal mixing process is not desired, or effective, or really possible in the mixing art where either viscous material or materials of different viscosities, such as an epoxy resin and a low viscosity liquid catalyst, are mixed. Instead, the mixing approach taken by the prior art involves the use of baffles or stream deflecting elements of a specific configuration within a conduit or passageway. Frequently, such devices require machine or block molding, casting, or sheet fabrication to obtain the desired baffle configurations. The consequent cost and difficulty of manufacture result in a relatively expensive end product.

Moreover, many of the prior art mixers provide less than complete mixing with polymeric fluids. Thus, viscous fluids traveling down a tubular conduit are in laminar flow with discrete streamline velocity vectors. Several prior art mixers do not produce proper mixing in such cases because their configurations tend to preserve and extend the velocity streamlines and fail to provide adequate radial mixing, i.e., movement of fluid from the wall to the center and back again, which is needed to effectively intermix the cross section and eliminate concentration, temperature or mass gradients.

The incomplete mixing of prior art mixers is also a significant problem when attempting to mix a relatively low viscosity liquid catalyst into a high viscosity resin. In this case, the low viscosity catalyst tends to channel along the walls of the passageway or conduit and resists intermixing with the polymer which tends to remain in the interior.

A further problem exists in liquid-liquid co-current extraction applications where static mixers are commonly used in order to insure uniform dispersions across the cross section. In such applications, many of the prior art devices exhibit centrifugal vectors which tend to segregate fluids with different densities. In these cases the lighter fluid would be near the center and the heavier fluid near the wall, resulting in ineffective performance.

One static mixer of particular note is described and claimed in U.S. Pat. No. 3,743,250, issued July 3, 1973 to Fitzhugh et al. entitled "Fluid Blending Device To Impart Spiral Axial Flow With No Moving Parts". The blender described in that patent comprises two series of identical, longitudinal spaced apart flow-guides with identical circumferential orientations and with opposite inclinations in opposite sides of a tubular housing. Fluid streams to be blended are guided in parallel, spiral paths axially through a multiplicity of successive blending zones formed between adjacent longitudinally spaced flow-guides. Despite the effectiveness of the Fitzhugh et al. device, it has been found that the static mixer of the present invention provides even more efficient blending.

BRIEF SUMMARY OF THE INVENTION

The above and other disadvantages and deficiencies of the prior art are alleviated by the static mixer and method of mixing fluids, particularly viscous fluids, according to the present invention. The static mixer according to the invention utilizes a mixing element comprising at least two banks of stationary baffle plates arranged around an axis which is parallel to the overall direction of flow of the fluids to be mixed. The baffle plates in each bank are inclined at an angle to the flow axis and inclined at an angle to the baffle plates of each adjacent bank, such that apertures are formed by abutting baffles at the interface between adjacent banks. Each bank contains one set of substantially parallel baffles spaced along the axis, and at least one of the banks contains a second set of substantially parallel baffles spaced along the axis and interspersed, preferably alternating, with the baffles of the first set. The baffles of the second set are similarly inclined to the axis as the first set, but at an angle different from the inclination of the baffles of the first set such that the plane of each baffle in the second set intersects the plane of at least one baffle in the first set at an intersection near the outer edges of the baffles.

If desired, all of the banks of baffles may have both types of sets. In a preferred embodiment there are two banks of baffles in the mixing element with the baffles in one bank slanted at an angle opposite to the baffles in the other bank. The mixing element may be used in a tubular housing where the outer edges of the baffles correspond substantially in circumferential profile to the inner wall of the tubular housing.

According to the mixing method of the present invention, fluid streams are fed to at least two series of blending zones arranged around an axis which is parallel to the overall direction of flow of the fluid streams. The blending zones of at least one series are wedge shaped passages inclined to the axis of flow and alternately diverging and converging in the general direction of flow. The fluid streams are substantially prevented from passing directly between blending zones in the same series without passing through a blending zone of an adjacent series. Thus, the fluid streams are alternately forced into and out of successive blending zones through apertures in the interfaces between adjacent series of blending zones so that the fluids are successively and repeatedly subdivided, converged and redivided into substreams which are guided by the apertures in sinuous, non-parallel spiraling paths through the blending zones to effect the blending.

Using the method and apparatus of the present invention, fluids of various viscosities, including high viscosity fluids, may be effectively and economically mixed using no moving parts and a simple, linear, compact construction, not limited to any particular size, and which may be varied to suit particular mixing requirements.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a side elevation view, partially broken away in cross section, illustrating a static mixer according to one embodiment of the present invention.

FIG. 2 is an enlarged cross sectional view of a portion of the static mixer shown in FIG. 1.

FIG. 3 is another enlarged view of the static mixer of FIG. 1 taken in cross section along line 3—3 of FIG. 2.

FIG. 4 is an enlarged view cut through the tubular housing of the static mixer of FIG. 1, either looking down into or up at the mixing element.

FIG. 5 is a slightly enlarged perspective view showing two of the baffle plates and a portion of the central shaft of the static mixer of FIG. 1.

DETAILED DESCRIPTION OF THE PREFERRED EMBODIMENTS

Figure 6:
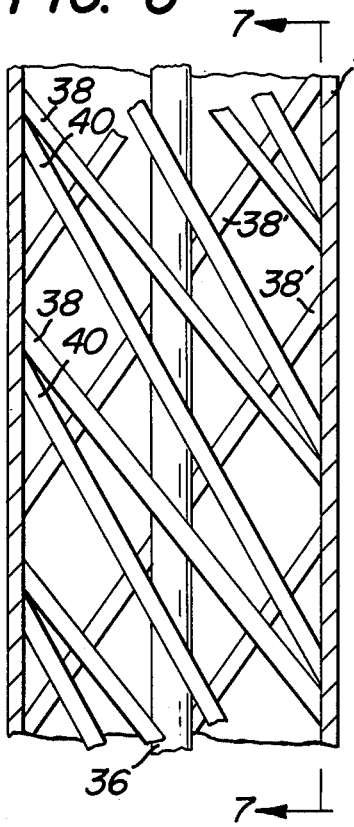
FIG. 6 is a cross sectional, elevation view of a portion of a static mixer according to another embodiment of the present invention.

Referring to the drawings in detail, wherein like numerals indicate like elements, there is shown in FIG. 1 a static mixer indicated generally as 20 according to one embodiment of the present invention. The mixer 20 comprises a tubular housing 22 having a fluid inlet 24, a fluid outlet 26 and a mixing zone 28. The housing 22, inlet 24 and outlet 26 may have any desired configuration, depending upon the particular application involved, and do not form any part of the present invention.

Adapted to fit in mixing zone 28 is a mixing element indicated generally as 30. Element 30 comprises two banks 32 and 34 (as best seen from the top or bottom in FIG. 4) of semi-eliptical baffle plates arranged on either side of a central shaft 36. As shown in FIGS. 1 and 2, shaft 36 lies along the longitudinal axis of mixing element 30 which is parallel to the overall or superficial direction of flow of fluids through the tubular housing.

As shown in FIGS. 1 and 2, each bank of mixing element 30 comprises two different sets of baffle plates having different inclinations to the axis or shaft 36, but the inclinations are similar in that they are both on the same side of the perpendicular to the axis. Thus, the bank in front of the shaft in FIGS. 1 and 2, which will be referred to as front bank 32 includes a first set of baffle plates 38, parallel to each other and equally spaced along the longitudinal axis, and a second set of baffle plates 40, also parallel to each other and equally spaced along the longitudinal axis, but interspersed and alternating with baffle plates 38. Similarly, the bank to the rear of shaft 36 as illustrated in FIGS. 1 and 2, which will be referred to as rear bank 34, includes a first set of baffle plates 38' which are parallel to each other and equally spaced along the longitudinal axis, and a second set of baffle plates 40' which are also parallel to each other and equally spaced along the longitudinal axis but interspersed and alternating with baffle plates 38'. The baffles of both sets are perpendicular to the interface between the banks.

In order to conform to the circular cross section of housing 22, as shown in FIG. 4, baffle plates 38 and 40 and 38' and 40' are in the form of truncated ellipses or semi-ellipses, as best shown in FIG. 5. Thus, the inner edge of a baffle plate corresponds to the major axis of an ellipse, and the outer or peripheral edge of a baffle plate conforms to the inner wall of the tubular housing to form a substantially fluid tight engagement between the outer edge of the baffle plate and the inner wall of the housing.

As shown in FIGS. 1 and 2, the first set baffle plates 38 and 38' of each bank are inclined to the longitudinal axis at an angle of approximately 45°, and the second set baffle plates 40 and 40' of each bank are inclined to the longitudinal axis at an angle of approximately 30°. As a result of these different angles, each bank of baffle plates consists of a series of semi-elliptical wedge shaped passages which alternately converge or narrow and diverge or widen in the general direction of flow of the fluids.

Depending upon the particular spacing of the baffle plates in each set and the particular angles of inclination to the longitudinal axis, each baffle plate of the second set may intersect one or more baffle plates of the first set at or near the outer peripheral edges of the baffle plates. As shown in FIGS. 1 and 2, it is preferred that the baffle plates 40 and 40' of the second sets intersect with the two adjacent baffle plates 38 and 38' of the first sets just inside the outer peripheral edges of the baffle plates.

Depending upon the method of manufacture of the mixing element 30, all of the baffle plates may be attached to central shaft 36 and/or to the baffle plates of the adjacent bank along the abutting inside edges of the baffle plates. Whether or not the baffle plates of adjacent banks are actually affixed or connected at the abutting points along the interface between the banks, a multiplicity of apertures or windows are formed along the interface, as best shown in FIG. 2.

Referring for convenience only to the front bank of baffle plates in FIG. 2, each diverging wedge-shaped passage has a plurality of apertures 42 through 58 along the interface with the baffle plates of the rear bank. Similarly, each converging wedge-shaped passage has a plurality of apertures 60-74 along the interface with the rear bank of baffle plates. Since the fluids being mixed will spiral downwardly through the mixing zone, as more fully described below, apertures 42, 44, 46 and 48 will serve as inlet or feed apertures for each diverging wedge-shaped passage, and apertures 50, 52, 54, 56 and 58 will serve as outlet or exit apertures for each diverging wedge-shaped passage.

Similarly, apertures 60, 62, 64, 66 and 68 will serve as inlet or feed apertures for each converging passage and apertures 70, 72 and 74 will serve as outlet or exit apertures for each converging passage.

Figure 9:
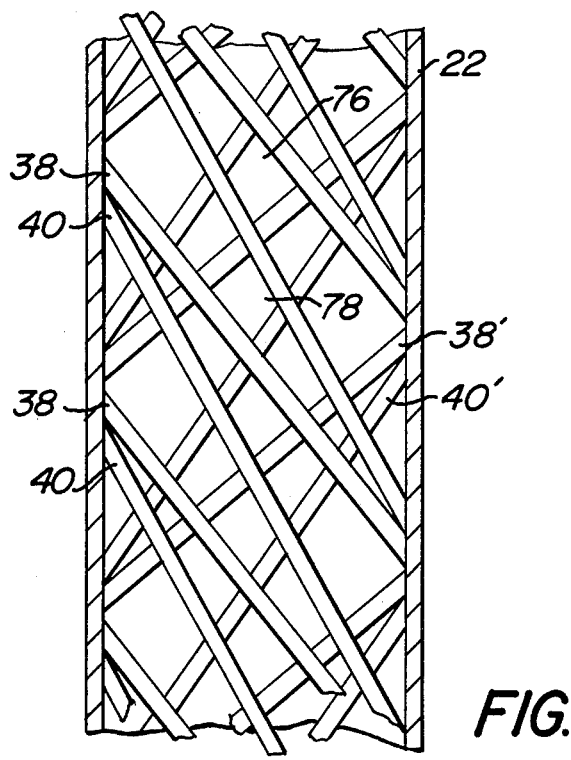
FIG. 9 is a cross sectional, elevation view of a static mixer according to the invention similar to FIG. 2, but without a central shaft.

Of course, it will be understood by those skilled in the art that the fluid dynamics of such a baffle system are not simple or regular, and apertures near the shaft 36, such as apertures 48, 50, 68 and 70 may conceivably serve as either inlets or outlets for fluid streams. Similarly, in the alternate embodiment shown in FIG. 9 where no central shaft is used, apertures near the center or axis of the element 30, such as apertures 76 and 78, may serve as either inlets or outlets for fluid streams. Since the embodiment of FIG. 9 uses no central shaft, the baffle plates of each bank may be conveniently affixed to each other at the points of contact or abutment along the interface between the banks.

Figure 7:
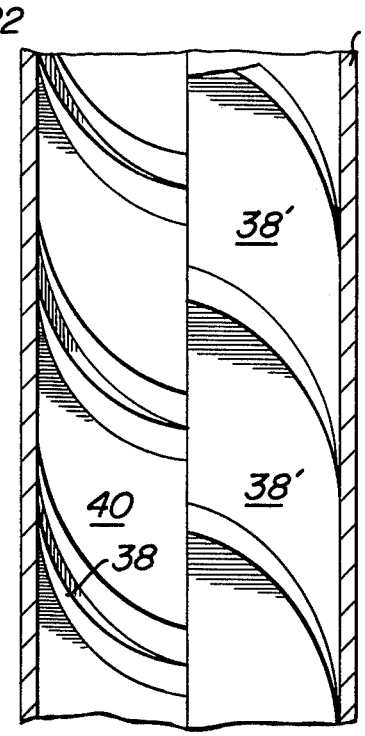
FIG. 7 is another elevation view taken in cross section along line 7—7 of FIG. 6.
Figure 8:
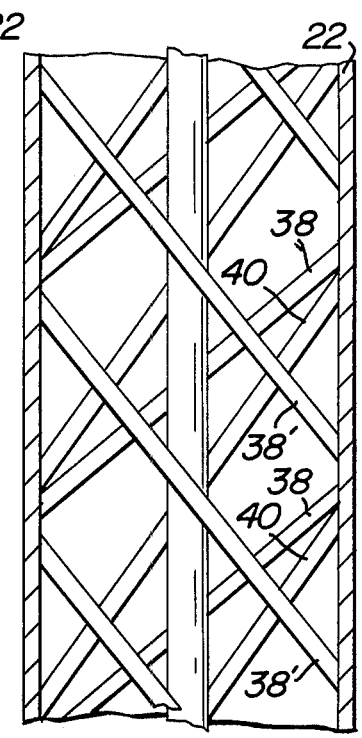
FIG. 8 is another cross sectional, elevation view similar to FIG. 6 but taken from the opposite side of the static mixer.

Turning now to FIGS. 6, 7 and 8, there is shown another embodiment of a static mixer according to the present invention. This embodiment is identical to the embodiment shown in FIGS. 1, 2 and 3, except that the rear bank of baffle plates in FIG. 6 (the front bank in FIG. 8) does not include a second set of baffle plates 40' (as in FIGS. 1-3), but only a first set of baffle plates 38'. Hence, although the front bank 32 in FIGS. 6 and 7 (the rear bank in FIG. 8) is still made up of a series of alternately converging and diverging passages, the rear bank 34 is made up of a series of passages having parallel walls. This type of arrangement produces a different flow pattern in each side or bank of the static mixer. As with the embodiments shown in FIGS. 1-3 and 9, the embodiment shown in FIGS. 6-8 can be with or without central shaft 36, as desired.

Although the embodiments shown in FIGS. 1-9 have employed only two banks of semi-elliptical baffles, more than two banks of baffles could be used for the mixing element. For example, the embodiment shown by the top or bottom view in FIG. 10 comprises three banks 80, 82 and 84 of baffle plates in the form of elliptical sectors. Each bank of the embodiment shown in FIG. 10 may contain both a first and a second set of baffle plates, similar to the embodiment in FIGS. 1-3, or alternatively one or two of the banks may contain only a first set of baffle plates, similar to the embodiment shown in FIGS. 6-8.

Of course, many variations within the scope of the present invention can be made in the static mixers besides the variations shown in the above-idsucssed embodiments. For example, although the baffles shown in the drawing are relatively thin, flat, solid plates, they could be made curved or undulating or angled, as desired. The baffles could also be made of varying thicknesses and provided with fins or surface protrusions of various kinds. It is also possible to provide the baffles with holes which would allow small streams of fluid to pass directly between adjacent passages in the same bank.

Figure 10:
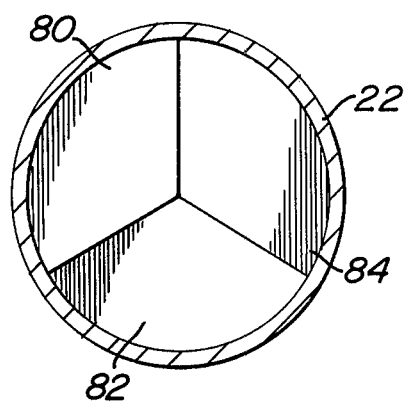
FIG. 10 is a top or bottom view similar to FIG. 4 but of a further embodiment wherein there are three banks of baffles instead of two.

Further, although the embodiments shown in the drawings have banks of equal sizes and baffles of equal elliptical sectors, the banks and baffles could be varied in size and proportion to the cross section of the mixing element. For example, instead of using three equal banks as shown in FIG. 10, the mixing element could be divided instead into two quarter circle banks of quarter elliptical baffles and one semi-circular bank of semi-elliptical baffles. Other possible variations will be readily apparent to those skilled in the art in view of the above disclosure.

Other possible variations within the scope of the present invention include changing the angles of the various sets of baffles with respect to the longitudinal axis, and with respect to corresponding sets in adjacent banks of baffles. For example, a bank's first set may be at a different angle of inclination with respect to the axis than an adjacent banks's first set. Although the baffles may assume virtually any angle of inclination to the axis, it is usually desirable that the first set of baffles have an inclination to the axis of between about 30° and 70°, and preferably about 45°. Similarly, it is usually desirable that the second set of baffles have an inclination of between about 20° and about 50° to the axis, and preferably about 30°. Also, the angle of intersection between alternating baffles of the two sets is desirably between about 10° and about 20°, and preferably about 15°. The intersections of the imaginary planes of the adjacent baffles of the first and second sets may be either inside or outside of the housing wall, but should be near the wall and preferably just inside the wall so that there is actual contact between adjacent baffles of the two sets.

Another possible variation within the scope of the invention would be to include in one or more of the banks a third set of baffles alternately interspersed among the first and second set baffles. In this variation, the passages would not alternate between converging and diverging, but would have multiple permutations such as converging passages alternating with two adjacent diverging passages.

It will also be apparent to those skilled in the art that the sizes and shapes and the size distributions of the interfacial apertures may be changed by shifting the banks longitudinally with respect to each other. As will be explained more fully below, such longitudinal shifting can materially affect the type of flow patterns which are created in the mixer.

The mixing element of the present invention may be manufactured in various manners depending upon the size and complexity of the element. For example, for larger elements metal baffles may be welded to a central metal shaft to form the element. For smaller elements, it may be most economical and convenient to injection mold the element with any of a wide variety of polymers, either as a single piece or as several pieces. As will be apparent, the mixing element may be designed in any desired cross sectional configuration to correspond to tubular housings of various shapes, including ellipses and other geometrical shapes, as well as circular cross sections.

The method of the present invention and operation of the static mixers of the invention will now be described in more detail with particular reference to FIGS. 1 and 2. However, it will be understood that the method and operation are similar for other embodiments according to the present invention. Moreover, although the method and operation will be described with particular reference to a blending or homogenizing of viscous liquids, it will be understood by those skilled in the art that the method and apparatus of the present invention can be applied to liquids of different viscosities, including liquids containing entrained pulverulent material, and can also be employed in liquid-liquid extraction processes where two imiscible liquids are intimately contacted. In addition, other material gradients, such as temperature or concentration, can be eliminated by the mixing of the present invention.

Referring to FIG. 1, two or more fluids to be mixed are fed to mixing zone 28 through fluid inlet 24 as indicated by the arrow. It is not necessary that the fluids be premixed in any manner, and the fluids may be metered in any required proportions.

Upon contacting the first two baffle plates (in this case the first plates 40 and 40'), the fluids are divided into two streams which begin to rotate or spiral counterclockwise around central shaft 36. It will be apparent that the spiraling or rotation could be clockwise if the banks were oriented in the opposite direction, but this orientation is entirely arbitrary.

As the streams spiral downwardly through the mixing element, they are repeatedly divided into a plurality of substreams by the apertures in the interface or cross-over plane formed between the adjacent banks of baffles. After passing through the apertures, each substream then combines with other substreams which enter the same passage from different passages in the other bank. These substreams entering the same passage combine and spiral around to the cross-over plane on the opposite side of the central shaft 36 where they are redivided into new substreams by the apertures in the cross-over plane or interface.

Referring more particularly to a portion of FIG. 2 where some of the apertures have been numbered as previously explained, fluid substreams may enter a diverging passage in the front bank 32 through apertures 42, 44, 46 and possibly 48. It will be noted that each of these substreams comes from a different passage in rear bank 34. The combined entering substreams combine and spread out as they spiral downwardly through the semi-elliptical diverging passage where they may exit the passage through any of apertures 52, 54, 56, 58 and possibly 50. It is to be noted that each of these apertures leads into a different passage of rear bank 34.

Similarly, in each converging passage fluid substreams may enter the passage through inlet apertures 60, 62, 64, 66 and possibly 68. These substreams will merge and combine as they move through the passage 30 on their continuing downward spiral, exiting through apertures 70, 72 and 74. Again, it will be noted that apertures 70, 72 and 74 each lead into different passages of rear bank 34, thus redividing the fluids into new substreams.

The repeated and successive dividing, combining and redividing of the fluid substreams into new substreams as they spiral downwardly through the successive blending zones of the mixing element results in a thorough blending and homogenizing of the different fluids introduced into the mixer. Although applicant does not wish to be bound by any particular theory, it is believed that the efficiency of the blending is greatly enhanced according to the present invention due to substantial radial mixing. Thus, fluids tend to favor larger openings over smaller openings. Therefore, it follows that in a diverging passage, a substantial portion of the fluid will enter through large aperture 46 which is adjacent to the central shaft, and will leave through large exit aperture 54 which is adjacent to the housing wall. This results in a significant radial displacement of fluid from near the center to near the wall.

Similarly, in each converging passage, a large portion of the fluid enters through inlet aperture 64 and exits through the largest exit aperture 70. This again represents a significant radial displacement of fluid, but this time from near the wall to near the center. Such radial displacement appears to prevent fluids of different densities or viscosities from remaining either along the central shaft or along the housing wall so that more complete and rapid mixing is achieved.

In other words, fluid substreams near the wall mostly tend to move into and through passages which are converging, and fluid substreams near the center are mostly moving into and through diverging passages. As the fluid moves through a passage it follows a parabolic path such that fluid in a converging passage has its cross section deformed and its center of mass radially displaced inwards, while fluid in a diverging channel is also having its cross section deformed and its center of mass radially displaced outwards. In banks where there are only parallel baffles and symmetrical channels, the fluid substreams move through a uniform elliptical path.

As previously alluded to, the nature of the flow patterns may be significantly changed by shifting the banks of baffles longitudinally with respect to each other. Thus, it will be found that predominantly larger or predominantly smaller apertures or windows can be produced in the interface or cross-over plane by appropriate longitudinal shifts of the banks. The overall effect is either to encourage rotational movement around the axis or to encourage channeling of the fluids, whereby the fluid streams dart back and forth in a serpentine manner in and out of the cross-over plane without substantial spiraling. It is believed to be advantageous to judiciously align the baffles longitudinally so that rotational movement predominates, but also to permit a small amount of channeling or serpentine movement.

Upon completion of the blending, the homogenized fluid stream emerges from the bottom of the mixing element 30 and exits through fluid outlet 26. The length of the mixing element 30 necessary to provide a given degree of blending will depend upon a larger number of factors, including the absolute and relative viscosities of the fluids, and the size and configuration of the various parts of the mixing element. However, an experiment has shown that the length of the mixing element needed for substantially complete blending according to the present invention is significantly shorter than the length needed for blending the same fluids using a mixing element as described in Fitzhugh et al. U.S. Pat. No. 3,743,250 according to the following procedure:

Two 9½ inch long, ¾ inch nominal I.D., circular cross-section, phenolic resin tubes were provided. In one tube were glued end to end two 4¼ inch long injection molded polypropylene elements of the present invention according to the embodiment of FIGS. 6-8. The other tube was slotted at approximately ¼ inch intervals in each side to receive sheet aluminum baffles which were glued in place after insertion to form a static mixer similar to the embodiment of FIGS. 6-10 of the Fitzhugh patent. Each mixer contained 48 baffles, with uniform spacing and the same average angle of inclination, the baffles of the first set of each bank in each mixer being inclined at about 45° to the axis and the baffles of the second set in one bank in the mixer of the present invention being inclined at an angle of about 30° to the axis.

Epoxy resin was uniformly metered (viscosity: approximately 100,000 centipoises) to the mixers using two caulking guns operating in tandem and connected to opposite branches of a "Y" joint. The resin was a two component epoxy obtained from REN Plastics division of Ciba-Geigy Corp. (resin RP 1340, hardener H 997) which was premixed, divided in half, one half dyed red, and the red and white portions placed in opposite guns for metering to the mixers in equal proportions at room temperature.

One end of each mixer described above was in turn attached to the bottom of the "Y" and epoxy resin was metered to the mixer from the caulking guns until a stream exuded from the opposite end. Each mixer was then detached from the bottom of the "Y", and the epoxy was allowed to harden. Visual examination of the resin cross-section at the exit end of the mixer according to the present invention revealed a substantially uniform pink color with only minor streaks of red and white. In contrast, the same examination of the mixer corresponding to the Fitzhugh patent revealed significant gradations of color with many dark red and distinctly white areas, indicating a substantially lesser degree of mixing than that according to the present invention.

The present invention may be embodied in other specific forms without departing from the spirit or essential attributes thereof and, accordingly, reference should be made to the appended claims, rather than to the foregoing specification as indicating the scope of the invention.

I claim:

1. An element for a static mixer for mixing fluids comprising:
    at least two banks of stationary baffle plates arranged around an axis which is parallel to the overall direction of flow of the fluids to be mixed,
    each bank abutting each adjacent bank along an interface extending from said axis so as to form interfacial apertures through which fluids may flow from one bank to an adjacent bank,
    the plane of each baffle plate being inclined at an angle to said axis and being inclined at an angle to the planes of the baffle plates of each adjacent bank,
    each bank having a first set comprising a plurality of baffle plates spaced along said axis with their planes substantially parallel to each other,
    at least one of said banks having a second set comprising a plurality of baffle plates with their planes substantially parallel to each other spaced along said axis and being similarly inclined to said axis as the baffle plates of said first set but at an angle different from the angle at which the baffle plates of said first set are inclined to the axis,
    the baffle plates of said second set in said at least one bank being interspersed with the baffle plates of the first set in that bank, and
    the plane of each plate in said second set intersecting the plane of at least one plate in said first set in the same bank at an intersection near the outer edges of said plates.

2. An element according to claim 1 wherein the baffle plates of the second set alternate with the baffle plates of the first set in said at least one bank.

3. An element according to claim 1 including a shaft which forms the axis of the element and on which the baffle plates are mounted.

4. An element according to claim 1 wherein each bank is affixed to each adjacent bank at the points of abutment of the baffle plates.

5. An element according to claim 1 wherein the spacing of baffle plates within a set is equal throughout the bank.

6. An element according to claim 1 wherein said banks are axially aligned in such a manner that the relative sizes and axial orientation of interfacial apertures encourage a predominance of rotational fluid movement but permit a small amount of channeling and serpentine movement.

7. An element according to claim 1 wherein the plane of each plate in said second set intersects the planes of two plates in said first set in the same bank at intersections near the outer edges of said plates.

8. An element according to claim 1 wherein each bank has both first and second sets of baffle plates.

9. An element according to claim 1 wherein there are two banks and the baffle plates are in the shape of truncated ellipses with the abutting edges corresponding to the major axis of the ellipses.

10. An element according to claim 1 wherein the planes of the baffle plates in each set of each bank are substantially perpendicular to the interfacial plane between adjacent banks.

11. An element according to claim 1 wherein at least one of said banks contains at least a third set of baffle plates interspersed among the baffle plates of said first and second sets.

12. An element according to claim 1 wherein the planes of the baffle plates of the first set are inclined to said axis at an angle of approximately 45°.

13. An element according to claim 12 wherein the planes of the baffle plates of the second set are inclined to said axis at an angle of approximately 30°.

14. A static mixer for mixing fluids comprising:
    (a) a tubular housing having a fluid inlet, a fluid outlet and a mixing zone between said inlet and said outlet, and
    (b) the element of claim 1 positioned in said mixing zone.

15. A static mixer according to claim 14 wherein the outer peripheral edges of the baffle plates are shaped to form substantially fluid tight engagement between said edges and the inner wall of the tubular housing.

16. A static mixer according to claim 15 wherein the element is removable from the tubular housing.

17. An element according to claim 1 wherein the element comprises an integral injection molded synthetic polymer.

18. A method for mixing viscous fluids without the use of moving parts comprising:
    feeding streams of the fluids to be mixed to at least two series of blending zones arranged around an axis which is parallel to the overall direction of flow of the fluid streams,
    the blending zones of at least one series comprising wedge shaped passages inclined to said axis of flow with the boundaries of said passages alternately diverging and converging in the general direction of flow,
    substantially preventing the fluid streams from passing directly between blending zones in the same series without passing through a blending zone of an adjacent series,
    alternately forcing said fluid streams into and out of successive blending zones through apertures in the interfaces between adjacent series of blending zones, whereby said fluid streams are successively and repeatedly subdivided, converged and redivided into a plurality of substreams which are guided and channeled by said interfacial apertures in sinuous, non-parallel spiralling paths through a multiplicity of blending zones to effect the desired degree of blending of the fluids.

19. A method according to claim 18 wherein said fluid streams are fed to two series of blending zones, both series having said wedge shaped passages with the passages in one series inclined to said axis at an angle substantially opposite to the inclination of the passages of the other series to said axis.

20. A method according to claim 18 wherein the blending zones of at least one series have passages which are not wedge shaped but have parallel boundaries inclined to said axis at an angle different from the inclination of the passages of adjacent series to said axis.

* * * * *